United States Patent [19]

Vogt

[11] 4,351,741
[45] * Sep. 28, 1982

[54] METHOD OF PREPARING ANTIMONY PENTOXIDE, COLLOIDS THEREOF AND THEIR PREPARATION

[75] Inventor: John W. Vogt, Chagrin Falls, Ohio

[73] Assignee: The Harshaw Chemical Company, Cleveland, Ohio

[*] Notice: The portion of the term of this patent subsequent to Jun. 20, 1995, has been disclaimed.

[21] Appl. No.: 9,032

[22] Filed: Feb. 5, 1979

[51] Int. Cl.$^3$ ................... B01J 13/00; C01G 30/00
[52] U.S. Cl. ..................... 252/313 R; 106/18.25; 106/18.28; 252/609; 252/610; 423/87; 423/617
[58] Field of Search ............. 252/313 R; 423/87, 617

[56] References Cited

U.S. PATENT DOCUMENTS 3,860,523  1/1975  Petrow et al. ............. 252/313 R X
4,026,819  5/1977  Langere et al. ............ 252/313 R
4,096,232  6/1978  Vogt .......................... 423/617 X

OTHER PUBLICATIONS

Mellor: A Comprehensive Treatise on Inorganic and Theoretical Chemistry, Longmans, Green & Co., Ltd., vol IX, p. 439 (1949).

Primary Examiner—Richard D. Lovering
Attorney, Agent, or Firm—Maky, Renner, Otto & Boisselle

[57] ABSTRACT

A method of preparing antimony pentoxide from solids containing antimony sulfides is described. The method comprises the steps of
(a) leaching the antimony values from the solids with an aqueous potassium hydroxide solution to form an antimony-containing solution and a gangue,
(b) oxidizing the antimony present in the leaching solution to a pentavalent antimony,
(c) recovering the oxidized solution, and
(d) adding an inorganic acid to the solution to reduce the pH of the solution to about 5-7 whereby antimony pentoxide is precipitated from the solution. The gangue may be separated from the leach solution either prior to or after the oxidizing step.

In a preferred embodiment, the oxidation of the solution is conducted in the presence of a catalyst which comprises a water-soluble copper salt, a quinone, a hydroquinone or mixtures of one or more of these.

16 Claims, No Drawings

METHOD OF PREPARING ANTIMONY PENTOXIDE, COLLOIDS THEREOF AND THEIR PREPARATION

BACKGROUND OF THE INVENTION

Attempts have been made to incorporate metallic oxides such as antimony oxide into organic polymers, both natural and synthetic, to improve their properties. For example, these oxides have been used to improve the resistance to burning, particularly when employed in conjunction with organic halogen compounds and other halogen-containing materials. While the exact mechanism which results in the flame-retardant properties is not fully understood, it is believed that an antimony oxide halogen compound may be formed in situ which interferes with oxidizing reactions and therefore inhibits burning.

A variety of techniques have been employed to introduce the antimony oxide into organic polymers. For example, oxide particles prepared by milling have been suspended in spinning solutions, molding solutions, or polymer melts in attempts to incorporate the oxide in the resulting film, fiber or molded body. The use of this technique generally results in delustering of the polymer due to the scattering of light by the large oxide particles, and the large particles also have relatively low chemical reactivity and a low efficiency as a flame proofing agent. In the case of fibers, the diameter of the oxide particles may approach the diameter of the fibers themselves thereby weakening the bond between the organic polymer and the oxide.

Antimony oxides also have been applied as surface coatings along with a resinous binder. These coating techniques, however, also result in delustering and produce fabrics which have a stiff, harsh hand, poor flexibility and low tear strength.

Additional attempts have been made in the art to avoid some of the deficiencies of the above procedures by using aggregates of oxides prepared as gels, as precipitated powders, and as aggregates prepared by oxidizing the corresponding metallic halides. The use of aggregates, however, has resulted in non-uniformity of properties resulting from the difficulties of preparing uniform aggregates and homogenously distributing the aggregates throughout the polymer.

More recently, it has been discovered that antimony oxide prepared as sols of colloidal particles of antimony oxide dispersed in various liquid media is useful. For example, U.S. Pat. No. 3,676,362 describes sols composed of substantially discrete colloidal particles of antimony oxide having an average particle size in the range of about 2 to about 50 millimicrons dispersed in a polar, organic liquid. Such sols can be mixed with a solution of a polymer in a polar organic liquid, and the mixture processed in a conventional manner for making fibers and films. These sols are prepared by reacting a metal halide with water and ammonia in a polar organic liquid. The water converts the halide to antimony oxide in colloidal dispersion and an ammonium salt precipitates.

U.S. Pat. No. 3,860,523 describes the preparation of colloidal antimony oxide sol, preferably in the $Sb_2O_5$ form with an average particle diameter of about 2 to 100 millimicrons. The sol is prepared by first preparing water-soluble potassium antimonate by reacting antimony trioxide with potassium hydroxide and hydrogen peroxide in the ratio of 1 mole to 2.1 moles to 2 moles, and thereafter deionizing the potassium antimonate by passing the solution through a hydrogen form cation exchange resin.

Another method for forming sols of antimony pentoxide is described in U.S. Pat. No. 3,657,179. This patent describes the reaction of antimony trichloride with nitric acid to form a dispersion in a polar organic solvent, and stabilizing the dispersion with an alpha-hydroxy carboxylic acid. Such dispersions contain from about 0.01 to 5% water by weight.

Another process for preparing colloidal dispersions of antimony pentoxide is described in U.S. Pat. No. 3,994,825, and the process involves mixing particles of antimony trioxide with an aliphatic polyhydroxy alcohol having vicinal hydroxyl groups and contacting said particles with hydrogen peroxide to convert the antimony trioxide to hydrous antimony pentoxide. Reaction preferably is accomplished at a temperature of between 50° and 105° C. The colloidal sol which results is a stable dispersion containing antimony pentoxide with a reported average size of from about 50 Angstroms to about 200 Angstroms.

More recently, an improved method for preparing colloidal aqueous sols of antimony pentoxide from a water insoluble metal antimonate was described in U.S. Pat. No. 4,110,247. The method involves passing a slurry of a water-insoluble metal antimonate through a fluidized bed containing a cation exchange resin whereby the metal antimonate is converted to a colloidal antimony pentoxide.

SUMMARY OF THE INVENTION

The present invention provides a method of preparing antimony pentoxide and colloidal aqueous sols of antimony pentoxide from antimony sulfide bearing solids, particularly naturally occurring ores and ore concentrates. The method of the invention comprises the steps of (a) leaching the antimony values from the solids with an aqueous potassium hydroxide solution to form an antimony-containing solution and a gangue, (b) oxidizing the antimony present in the leaching solution to a pentavalent antimony, (c) recovering the oxidized solution, and (d) adding an inorganic acid to the solution to reduce the pH of the solution to about 5–7 whereby antimony pentoxide is precipitated from the solution. The gangue may be removed from the leach solution either before or after the oxidizing step. The antimony pentoxide recovered as a precipitate in the method of the invention either can be dried to a powder which is easily reduced by milling to useful particle sizes for dispersion in plastics and other materials, or the antimony pentoxide precipitate can be dispersed in water to form stable antimony pentoxide colloids containing up to about 30 to 40% solids.

DESCRIPTION OF THE PREFERRED EMBODIMENTS

The present invention relates to a method of preparing antimony pentoxide and antimony pentoxide colloidal sols from naturally occurring ores which contain antimony sulfide. The method of the invention comprises leaching the antimony from the antimony sulfide bearing ores utilizing an alkaline solution prepared from potassium hydroxide, oxidizing the antimony present in the leach solution to a pentavalent antimony, and precipitating antimony pentoxide from the oxidized solution by the addition of an inorganic acid to the solution to reduce the pH to from about 5 to 7. The antimony pentoxide prepared in this manner appears to have unique properties such as the facile reduction of the dried powder to fine particle size antimony pentoxide. Also, it has been discovered that the antimony pentoxide powder obtained in this manner exhibits excellent dispersability in thermoplastics such as polypropylene. Moreover, aqueous colloids can be prepared from the antimony pentoxide prepared in accordance with the method of the invention which exhibit improved stability, even when the colloids contain up to about 30 to 40% of solids.

The first step in the procedure of this invention for extracting and isolating pentavalent antimony from solids containing antimony sulfides is the leaching of the antimony values from the solids with an aqueous basic solution of potassium hydroxide to form an antimony-containing solution. Basic solutions such as those obtained by dissolving a base such as potassium oxide, potassium hydroxide, potassium carbonate, and mixtures thereof in water, are useful. The concentration of the potassium hydroxide in the water is not critical although concentrations of potassium hydroxide of from about 5 to about 25% by weight or higher are preferred. Although the natural ores which provide the desired source of antimony may contain arsenic, most of the arsenic in the solids remains in the gangue thus giving a substantially arsenic-free antimony solution.

Potassium hydroxide solutions are utilized as the leaching medium since the immediate and final antimony compounds are soluble in water and, therefore, the valuable antimony products are not lost when the gangue is separated. It is believed that the soluble final antimony compound is in the form of potassium antimonate. Because of the water solubility of the potassium antimonate which is formed, the gangue need not be separated immediately after the antimony values are leached from the ore, but the gangue may be removed after the oxidation is complete or at some earlier intermediate stage of oxidation as may be desired.

After the antimony values have been leached from the ore with the aqueous potassium hydroxide solution as described above, the solution is oxidized by passing oxygen or air through the leached solution, and the antimony present in the solution is oxidized to pentavalent antimony. Any source of oxygen may be utilized including pure oxygen or air which preferably is bubbled through the solution to provide maximum contact with the liquor. The oxidation reaction is exothermic, and the solution temperature rises spontaneously. External heat may be supplied to raise the temperature of the solution which reduces the reaction time. Completion of the oxidation reaction is indicated by a peaking and decline of the solution temperature and a negative sulfide ion test. In this test, diluted hydrochloric acid is added to a few drops of the oxidized mixture. If sulfide ion is present, an orange precipitate of antimony sulfide will form immediately. When the air oxidation is completed and sulfide ion is absent, the orange precipitate will not form immediately.

The rate of the oxidation reaction can be greatly increased by including certain catalysts in the leached solution prior to oxidation. This catalytic procedure is described in my earlier patent U.S. Pat. No. 4,096,232. The catalyst which is particularly useful for improving the oxidation rate comprises a water-soluble copper salt, a quinone, a hydroquinone, or mixtures of one or more of these materials. In addition to the above named materials, the catalysts also may contain ferrous ions. For example, the effectiveness of copper ions appears to be improved by the presence of a small amount of ferrous ions. Copper salts which are useful include copper sulfate, copper chloride, etc. The catalyst also may be a quinone which may be defined as a cyclic unsaturated ketone having two carbonyl groups directly attached to a six-membered ring containing two double bonds (*Nomenclature of Organic Compounds,* John H. Fletcher et al., editors, American Chemical Society, Washington, D.C., 1974, page 225). The six-membered ring may contain various substituents such as alkyl groups, halogens, etc., so long as the substituents do not interfere with catalytic effect of the quinone structure. The term quinone as used in this specification and the attached claims also includes polynuclear quinones wherein the above defined six-membered ring is attached to one or more six-membered rings containing three double bonds. Examples of such polynuclear quinones include 1,4-naphthalene dione; 1,2-naphthalene dione; 9,10-anthracene dione.

The hydroquinones which are useful as a catalyst in the process of the invention are the hydroquinones derived from the above described quinones. Thus, the hydroquinones may be defined as cyclic unsaturated diols having two hydroxy groups directly attached to a six-membered ring containing three double bonds (i.e. a benzene ring). The relationship between the quinones and hydroquinones may be illustrated as follows:

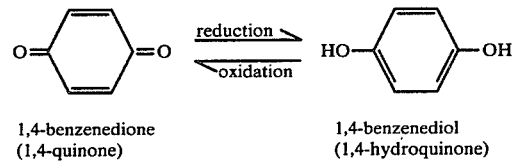

1,4-benzenedione      1,4-benzenediol
(1,4-quinone)     (1,4-hydroquinone)

Examples of hydroquinones which are useful as catalysts in the invention include benzenediol compounds such as 1,2-benzenediol (pyrocatechol) and 1,4-benzenediol.

Mixtures of water-soluble copper salts and a hydroquinone have been found to be particularly useful as a catalyst in the method of the invention. For example, even though the rate of oxidation of an ore concentrate containing antimony sulfide is increased when copper sulfate or 1,4-benzenediol is included in the ore, an even greater increase in the rate of oxidation is obtained when the combination of copper sulfate and 1,4-benzenediol is utilized as the catalyst. In general, the catalytic mixtures will comprise a copper salt and a hydroquinone in a weight ratio of from about 1:1 to about 1:5 and preferably from about 1:1 to about 1:3.

The amount of catalyst utilized in the method of the invention may vary depending on the variety of conditions and can be determined readily by one skilled in the art. In general, it has been found that from about 0.5 to about 1.5 percent by weight of the catalyst based on the weight of ore is satisfactory for catalyzing the oxidation reaction of antimony bearing solids such as ore concentrate containing about 50 to 70% antimony sulfides.

With potassium hydroxide solutions there is considerable saving in time and energy since the leaching and the air oxidation can be simultaneously effected because of the solubility of the potassium antimonate. Oxidation with air or oxygen is begun immediately upon mixing of the ore, potassium hydroxide and catalyst, and the gangue need not be separated until the oxidation is completed. Heat supplied from the exothermic reactions which occur warms the reaction mixture thus promoting a continuous and eventually complete leaching of the antimony values from the ore.

After the oxidation has been completed and the gangue removed by filtration, the soluble pentavalent antimony is recovered as antimony pentoxide by adding an inorganic acid to the solution in sufficient quantity to reduce the pH of the solution to a value of from about 5 to about 7 whereby the antimony pentoxide is precipitated from the solution. Inorganic acids such as hydrochloric and sulfuric acid can be utilized although a mixture of one part of water and from one to four parts of sulfuric acid is preferred. The precipitated antimony pentoxide can be washed with dilute sulfuric acid to remove undesired impurities followed by washing with water to remove sulfuric acid.

The antimony pentoxide prepared in this manner can be allowed to air dry or may be dried at an elevated temperature such as in an oven at a temperature of about 100° to 150° C. The dried product prepared in this manner is a white powder which can be easily milled to a useful small particle size powder such as a powder having an average particle size of about 0.7 microns.

When a colloidal sol of antimony pentoxide is desired, the sol can be prepared directly from the precipitated antimony pentoxide by dispersing the filter cake in water, preferably hot water at a temperature above 50° C. The colloidal sols obtained in this manner generally are transluscent at the lower concentrations and are non-settling for as long as several weeks even when the sols contain up to 30 or 40% of the solid antimony pentoxide.

The following examples illustrate the method of the invention for extracting antimony from antimony sulfide bearing ores and recovering antimony pentoxide either as a powder or as a colloidal sol. Unless otherwise indicated, all percentages are by weight.

EXAMPLE 1

A mixture of 300 grams of an ore concentrate containing about 15% antimony and 1.5% arsenic, 350 grams of potassium hydroxide pellets and 1400 ml. of water is prepared and stirred at a temperature of about 60° to 80° C. for about one-half hour. The mixture is filtered while hot to separate the gangue. Air is sparged through the clear dark yellow filtrate until a negative test for soluble sulfide is obtained.

On completion of the oxidation, a 1:1 mixture of water:sulfuric acid is added dropwise until the pH of the solution is about 5–6. A precipitate of hydrated antimony pentoxide is formed. The mixture is allowed to stand for about one hour to complete the precipitation of the antimony pentoxide, and the mixture is filtered to recover the desired antimony pentoxide. The filter cake is washed with dilute sulfuric acid (pH 4–6) until the filtrate is colorless and finally with water to remove final traces of sulfuric acid. The filter cake is air dried followed by drying in an oven at 120°. The antimony pentoxide powder prepared in this manner is milled to a fine powder having an average particle size of about 0.01 to about 0.5 microns.

EXAMPLE 2

A mixture of 300 grams of the ore concentrate used in Example 1, 330 grams of potassium hydroxide pellets and 1400 grams of water is prepared and stirred for about 0.5 hour. The mixture is filtered while hot and the solid gangue residue is discarded. To the filtrate, there is added 8 ml. of 1% Superfloc solution diluted to 200 ml. and the solution is filtered. Hydroquinone (2–3 grams) is added to the filtrate and the filtrate is sparged with air. The temperature of the reaction mixture increases, and the reaction is completed in about three hours. The solution is filtered and a 1:1 mixture of sulfuric acid:water is added with stirring to the filtrate until the pH is about 6. At this pH, suspended solids begin settling when the stirring is stopped and after about 1.5 hours, the settling is substantially completed. The precipitate is recovered by filtration and is dried and easily ground to a fine powder. Alternatively, the filter cake can be dispersed in hot water to form a non-settling colloid.

EXAMPLE 3

The procedure of Example 2 is repeated except that 1.5 grams of the hydroquinone is replaced by 0.5 grams of copper sulfate pentahydrate.

EXAMPLE 4

The procedure of Example 2 is repeated except that the hydroquinone is replaced by an equivalent amount of copper sulfate pentahydrate.

The powdered antimony pentoxide and the antimony pentoxide sols prepared in accordance with the method of the invention can be readily dispersed in various polymeric compositions and particularly in thermoplastic polymers such as polyethylene and polypropylene. It has been discovered that the antimony pentoxide powders prepared in accordance with the invention exhibit excellent dispersability in polypropylene, and in some instances, the dispersability of the powders of the present invention is improved when compared to antimony pentoxide powders prepared by other methods. The reason for the improved dispersability is not understood at this time but such improvement may be due to the presence of residual potassium ions which may be present in the powders which may interact in some unknown synergistic manner with the other ions in the powder.

The antimony pentoxide sols which can be prepared in accordance with the method of the invention also exhibit excellent dispersability in polymers and particularly thermoplastic polymers. When incorporated into polymers, the antimony pentoxide powders and sols of the invention improve the flame retardant properties of the polymers. Examples of thermoplastic polymers include olefin polymers such as polyethylene, polypropylene, poly-1-butene, polystyrene, polybutadiene-1,3, etc. The antimony pentoxide powders and sols of the invention also can be included in other polymers such as polyvinylchloride, polyvinylacetate, polymethylmethacrylate, polyacrylonitrile, copolymers of acrylonitrile with vinyl halides, etc.

The antimony pentoxide sols prepared in accordance with the method of the invention may be combined with other known flame retardants such as organic chlorides, bromides and other halogen-containing materials and utilized as coatings for fabrics, textiles and plastics for rendering these materials flame retardant. The amount of antimony pentoxide sol and halogen-containing compound applied to the fabrics, textiles and plastics can be varied and readily determined by one skilled in the art.

I claim:

1. A method of preparing antimony pentoxide from antimony sulfide-bearing solids which comprises the steps of
    (a) leaching the antimony values from the solids with an aqueous potassium hydroxide solution to form an antimony-containing solution and a gangue,
    (b) oxidizing the antimony present in the leaching solution to a pentavalent antimony,
    (c) recovering the oxidized solution, and
    (d) adding an inorganic acid to the solution to reduce the pH of the solution to about 5–7 whereby antimony pentoxide is precipitated from the solution.

2. The method of claim 1 wherein the oxidation in step (b) is conducted in the presence of a catalyst comprising a water-soluble copper salt, a quinone, a hydroquinone, or mixtures of one or more of these.

3. The method of claim 2 wherein the catalyst is a mixture of a water-soluble copper salt and a hydroquinone.

4. The method of claim 2 wherein the hydroquinone is a benzenediol.

5. The method of claim 2 wherein the copper salt is copper sulfate.

6. The method of claim 1 wherein sufficient acid is added in step (d) to reduce the pH of the solution to about 6.

7. The method of claim 1 wherein the gangue is separated from the leaching solution prior to oxidation.

8. The method of claim 1 wherein the gangue is separated from the leach solution after oxidation.

9. A method of preparing antimony pentoxide from antimony sulfide-bearing solids which comprises the steps of
    (a) leaching the antimony values from the solids with an aqueous potassium hydroxide solution containing a catalyst comprising a water-soluble copper salt, a quinone, a hydroquinone, or mixtures of one or more of these to form an antimony-containing alkaline solution and a gangue,
    (b) passing oxygen through the antimony-containing alkaline solution containing the catalyst whereby the antimony present in the solution is oxidized to a pentavalent antimony,
    (c) recovering the oxidized solution from the gangue,
    (d) adding an inorganic acid to the solution to reduce the pH of the solution to about 5–7 whereby antimony pentoxide is precipitated from the solution, and
    (e) recovering the antimony pentoxide.

10. The method of claim 9 wherein steps (a) and (b) are combined as a single step, whereby oxygen is passed through an aqueous mixture comprising the antimony sulfide-bearing solids, the catalyst, and potassium hydroxide.

11. The method of claim 9 wherein the gangue is separated from the leach solution after step (a) and before oxidizing the solution in step (b).

12. The method of claim 9 wherein the catalyst is a mixture of a copper salt and a hydroquinone.

13. The method of claim 12 wherein the catalyst is a mixture of copper sulfate and 1,4-benzenediol.

14. The method of claim 13 wherein the weight ratio of copper sulfate to 1,4-benzenediol is in the range of from about 1:1 to about 1:5.

15. A method of preparing antimony pentoxide colloids which comprises dispersing the antimony pentoxide prepared in accordance with the method of claim 1 in water.

16. The method of claim 15 wherein the weight ratio of antimony pentoxide to water is sufficient to provide a colloid containing up to about 40% of antimony pentoxide.

* * * * *